US012190766B2

(12) United States Patent
Li

(10) Patent No.: US 12,190,766 B2
(45) Date of Patent: Jan. 7, 2025

(54) DRIVING CIRCUIT AND DISPLAY DEVICE

(71) Applicant: TCL CHINA STAR OPTOELECTRONICS TECHNOLOGY CO., LTD., Guangdong (CN)

(72) Inventor: Jialong Li, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,867

(22) PCT Filed: Apr. 18, 2022

(86) PCT No.: PCT/CN2022/087343
§ 371 (c)(1),
(2) Date: Sep. 28, 2023

(87) PCT Pub. No.: WO2023/178773
PCT Pub. Date: Sep. 28, 2023

(65) Prior Publication Data

US 2024/0153421 A1 May 9, 2024

(30) Foreign Application Priority Data

Mar. 24, 2022 (CN) ......................... 202210298373.6

(51) Int. Cl.
*G09G 3/20* (2006.01)

(52) U.S. Cl.
CPC ............. *G09G 3/20* (2013.01); *G09G 3/2092* (2013.01); *G09G 2310/0267* (2013.01); *G09G 2320/043* (2013.01)

(58) Field of Classification Search
None
See application file for complete search history.

(56) References Cited

U.S. PATENT DOCUMENTS

2008/0303769 A1* 12/2008 Tobita .................... G11C 19/28 345/92
2009/0160848 A1* 6/2009 Tsuchi ............. H03K 3/356139 327/333
2020/0184888 A1* 6/2020 Brownlow ........... G09G 3/3266

FOREIGN PATENT DOCUMENTS

CN 105632438 A 6/2016
CN 106896957 A 6/2017
(Continued)

OTHER PUBLICATIONS

International Search Report in International application No. PCT/CN2022/087343, mailed on Dec. 15, 2022.
(Continued)

*Primary Examiner* — Parul H Gupta
(74) *Attorney, Agent, or Firm* — PV IP PC; Wei Te Chung

(57) ABSTRACT

The present disclosure discloses a driving circuit and a display device. The driving circuit of the present disclosure inputs a level signal to a first node under the control of a first signal control terminal and a second signal control terminal, and then outputs a signal of a first power supply terminal or a second power supply terminal to the output terminal under the control of the level signal of the first node, so as to output different level signals under the control of two the control signals, thereby resolving a problem that one timing controller cannot be directly matched with different gate driving chips in use.

20 Claims, 7 Drawing Sheets

(56) References Cited

FOREIGN PATENT DOCUMENTS

| | | | |
|---|---|---|---|
| CN | 108766335 | A | 11/2018 |
| CN | 110767175 | A | 2/2020 |
| CN | 110767176 | A | 2/2020 |
| JP | 2001326570 | A | 11/2001 |

OTHER PUBLICATIONS

Written Opinion of the International Search Authority in International application No. PCT/CN2022/087343, mailed on Dec. 15, 2022.

* cited by examiner

DRIVING CIRCUIT AND DISPLAY DEVICE

TECHNICAL FIELD

The present disclosure relates to a display technology field, and more particularly to a driving circuit and a display device.

BACKGROUND

The display device, as a display component of an electronic device, has been widely applied to various electronic products, and a gate driving chip is an important component of the display device. The gate driving chip may also be referred to as a GOA (Gate Driver On Array) chip, which adopts an array manufacturing process for a thin film transistor display device to configure the gate-line-row-scanning-driving-signals on the array substrate so as to realize the driving method of scanning the gate lines row by row.

A main driving principle of the thin film transistor display device is that: R/G/B compression signals, control signals, and the power are connected to a connector on a circuit board via wires in a main board of a system, data may, after processed by a timing controller on the circuit board, be inputted to display pixels by a source driving chip and a gate driving chip respectively, so that the display device obtains the required power supply and signals. A plurality of control signals are required for controlling the gate driving chip by the timing controller. However, driving chips manufactured by different manufactures use either high or low levels for controlling signals. This causes the timing controller to be unable to be directly matched with different types of gate driving chips in use. Therefore, different types of gate driving chips need to be matched with different timing controllers, so that different versions of circuit boards need to be designed, which increases the use of raw materials and production costs.

Technical Problems

The present disclosure provides a driving circuit and a display device, so as to resolve a problem that one timing controller cannot be directly matched with different gate driving chips in use.

Technical Solutions to the Problem

The present disclosure provides a driving circuit, including:

an input module connected to a first signal control terminal, a second signal control terminal, and a first node, respectively, for inputting a level signal to the first node under the control of the first signal control terminal and the second signal control terminal; and an output module connected to a first power supply terminal, a second power supply terminal, the first node, and an output terminal, respectively, for outputting a signal of the first power supply terminal or the second power supply terminal to the output terminal under the control of the level signal of the first node.

Optionally, in some embodiments of the present disclosure, the input module includes:

a first transistor, wherein a gate of the first transistor is connected to the first signal control terminal, one of a source and a drain of the first transistor is connected to the second signal control terminal, and another of the source electrode and the drain electrode of the first transistor is connected to the first node; and a second transistor, wherein a gate of the second transistor is connected to the first signal control terminal, one of a source and a drain of the second transistor is connected to the second signal control terminal, and another of the source electrode and the drain electrode of the second transistor is connected to the first node;

wherein the first transistor is one of a P-type transistor and an N-type transistor, and the second transistor is another of the P-type transistor and the N-type transistor.

Optionally, in some embodiments of the present disclosure, the output module includes:

a third transistor, wherein a gate of the third transistor is connected to the first node, one of a source and a drain of the third transistor is connected to the first power supply terminal, and another of the source electrode and the drain electrode of the second transistor is connected to the output terminal; and a fourth transistor, wherein a gate of the fourth transistor is connected to the first node, one of a source and a drain of the fourth transistor is connected to the second power supply terminal, and another of the source electrode and the drain electrode of the fourth transistor is connected to the output terminal;

wherein the third transistor is one of a P-type transistor and an N-type transistor, and the fourth transistor is another of the P-type transistor and the N-type transistor.

Optionally, in some embodiments of the present disclosure, the input module further includes:

a fifth transistor, wherein a gate of the fifth transistor is connected to a second node, one of a source and a drain of the fifth transistor is connected to a third power supply terminal, and another of the source electrode and the drain electrode of the fifth transistor is connected to the first node; and a sixth transistor, wherein a gate of the sixth transistor is connected to the second node, one of a source and a drain of the sixth transistor is connected to a fourth power supply terminal, and another of the source electrode and the drain electrode of the sixth transistor is connected to the first node;

wherein another of the source electrode and the drain electrode of the first transistor is connected to the second node, the fifth transistor is one of a P-type transistor and an N-type transistor, and the sixth transistor is another of the P-type transistor and the N-type transistor.

Optionally, in some embodiments of the present disclosure, the output module further includes:

a seventh transistor, wherein a gate of the seventh transistor is connected to a third node, one of a source and a drain of the seventh transistor is connected to a fourth node, and another of the source electrode and the drain electrode of the seventh transistor is connected to the output terminal; and an eighth transistor, wherein a gate of the eighth transistor is connected to the third node, one of a source and a drain of the sixth transistor is connected to the fourth node, and another of the source electrode and the drain electrode of the eighth transistor is connected to the output terminal;

wherein, another of the source and the drain of the third transistor is connected to the fourth node, and another of the source electrode and the drain electrode of the fourth transistor is connected to the fourth node;

wherein the first signal control terminal is connected to the third node, the seventh transistor is one of a P-type transistor and an N-type transistor, and the eighth transistor is another of the P-type transistor and the N-type transistor.

Optionally, in some embodiments of the present disclosure, the output module further includes:

a seventh transistor, wherein a gate of the seventh transistor is connected to the third node, one of a source and a drain of the seventh transistor is connected to the fourth node, and another of the source electrode and the drain electrode of the seventh transistor is connected to the output terminal; and an eighth transistor, wherein a gate of the eighth transistor is connected to the third node, one of a source and a drain of the sixth transistor is connected to the fourth node, and another of the source electrode and the drain electrode of the eighth transistor is connected to the output terminal;

wherein, another of the source and the drain of the third transistor is connected to the fourth node, and another of the source electrode and the drain electrode of the fourth transistor is connected to the fourth node;

wherein, the second signal control terminal is connected to the third node, the seventh transistor is one of a P-type transistor and an N-type transistor, and the eighth transistor is another of the P-type transistor and the N-type transistor.

Optionally, in some embodiments of the present disclosure, the first power supply terminal and the third power supply terminal are the same power supply terminal; and the second power supply terminal and the fourth power supply terminal are the same power supply terminal.

Optionally, in some embodiments of the present disclosure, the first power supply terminal and the fourth power supply terminal are the same power supply terminal; and the second power supply terminal and the third power supply terminal are the same power supply terminal.

Alternatively, in some embodiments of the present disclosure, the signals of the first power supply terminal and the third power supply terminal are a high level signal or a low level signal, and the signals of the second power supply terminal and the fourth power supply terminal are a low level signal or a high level signal.

Alternatively, in some embodiments of the present disclosure, the signals of the first power supply terminal and the fourth power supply terminal are a high level signal or a low level signal, and the signals of the second power supply terminal and the third power supply terminal are a low level signal or a high level signal.

Correspondingly, the present disclosure further provides a display device including a driving circuit, wherein the driving circuit includes:

an input module connected to a first signal control terminal, a second signal control terminal, and a first node, respectively, for inputting a level signal to the first node under the control of the first signal control terminal and the second signal control terminal; and an output module connected to a first power supply terminal, a second power supply terminal, the first node, and an output terminal, respectively, for outputting a signal of the first power supply terminal or the second power supply terminal to the output terminal under the control of the level signal of the first node.

Optionally, in some embodiments of the present disclosure, the display device further includes:

a timing controller connected to the first signal control terminal and the second signal control terminal of the driving circuit; and a gate driving chip connected to the output terminal of the driving circuit.

Optionally, in some embodiments of the present disclosure, the input module includes:

a first transistor, wherein a gate of the first transistor is connected to the first signal control terminal, one of a source and a drain of the first transistor is connected to the second signal control terminal, and another of the source electrode and the drain electrode of the first transistor is connected to the first node; and a second transistor, wherein a gate of the second transistor is connected to the first signal control terminal, one of a source and a drain of the second transistor is connected to the second signal control terminal, and another of the source electrode and the drain electrode of the second transistor is connected to the first node;

wherein the first transistor is one of a P-type transistor and an N-type transistor, and the second transistor is another of the P-type transistor and the N-type transistor.

Optionally, in some embodiments of the present disclosure, the output module includes:

a third transistor, wherein a gate of the third transistor is connected to the first node, one of a source and a drain of the third transistor is connected to the first power supply terminal, and another of the source electrode and the drain electrode of the second transistor is connected to the output terminal; and a fourth transistor, wherein a gate of the fourth transistor is connected to the first, one of a source and a drain of the fourth transistor is connected to the second power supply terminal, and another of the source electrode and the drain electrode of the fourth transistor is connected to the output terminal;

wherein the third transistor is one of a P-type transistor and an N-type transistor, and the fourth transistor is another of the P-type transistor and the N-type transistor.

Optionally, in some embodiments of the present disclosure, the input module further includes:

a fifth transistor, wherein a gate of the fifth transistor is connected to the second node, one of a source and a drain of the fifth transistor is connected to a third power supply terminal, and another of the source electrode and the drain electrode of the fifth transistor is connected to the first node; and a sixth transistor, wherein a gate of the sixth transistor is connected to the second node, one of a source and a drain of the sixth transistor is connected to a fourth power supply terminal, and another of the source electrode and the drain electrode of the sixth transistor is connected to the first node;

wherein another of the source electrode and the drain electrode of the first transistor is connected to the second node, the fifth transistor is one of a P-type transistor and an N-type transistor, and the sixth transistor is another of the P-type transistor and the N-type transistor.

Optionally, in some embodiments of the present disclosure, the output module further includes:

a seventh transistor, wherein a gate of the seventh transistor is connected to the third node, one of a source and a drain of the seventh transistor is connected to the fourth node, and another of the source electrode and the drain electrode of the seventh transistor is connected to the output terminal; and an eighth transistor, wherein a gate of the eighth transistor is connected to the third node, one of a source and a drain of the sixth transistor is connected to the fourth node, and another of the source electrode and the drain electrode of the eighth transistor is connected to the output terminal;

wherein, another of the source and the drain of the third transistor is connected to the fourth node, and another of the source electrode and the drain electrode of the fourth transistor is connected to the fourth node;

wherein the first signal control terminal is connected to the third node, the seventh transistor is one of a P-type transistor and an N-type transistor, and the eighth transistor is another of the P-type transistor and the N-type transistor.

Optionally, in some embodiments of the present disclosure, the output module further includes:

a seventh transistor, wherein a gate of the seventh transistor is connected to the third node, one of a source and a drain of the seventh transistor is connected to the fourth node, and another of the source electrode and the drain electrode of the seventh transistor is connected to the output terminal; and an eighth transistor, wherein a gate of the eighth transistor is connected to the third node, one of a source and a drain of the sixth transistor is connected to the fourth node, and another of the source electrode and the drain electrode of the eighth transistor is connected to the output terminal;

wherein, another of a source and a drain of the third transistor is connected to the fourth node, and another of the source electrode and the drain electrode of the fourth transistor is connected to the fourth node;

wherein, the second signal control terminal is connected to the third node, the seventh transistor is one of a P-type transistor and an N-type transistor, and the eighth transistor is another of the P-type transistor and the N-type transistor.

Optionally, in some embodiments of the present disclosure, the first power supply terminal and the third power supply terminal are the same power supply terminal; and the second power supply terminal and the fourth power supply terminal are the same power supply terminal.

Optionally, in some embodiments of the present disclosure, the first power supply terminal and the fourth power supply terminal are the same power supply terminal; and the second power supply terminal and the third power supply terminal are the same power supply terminal.

Alternatively, in some embodiments of the present disclosure, the signals of the first power supply terminal and the third power supply terminal are a high level signal or a low level signal, and the signals of the second power supply terminal and the fourth power supply terminal are a low level signal or a high level signal.

Beneficial Effects

The present disclosure provides the driving circuit and the display device, wherein the driving circuit includes: the input module connected to the first signal control terminal, the second signal control terminal, and the first node, respectively, for inputting the level signal to the first node under the control of the first signal control terminal and the second signal control terminal; and the output module connected to the first power supply terminal, a second power supply terminal, the first node, and the output terminal, respectively, for outputting the signal of the first power supply terminal or the second power supply terminal to the output terminal under the control of the level signal of the first node. The present disclosure inputs the level signal to the first node under the control of the first signal control terminal and the second signal control terminal, and then outputs the signal of the first power supply terminal or the second power supply terminal to the output terminal under the control of the level signal of the first node, thereby outputting different level signals under the control of two control signals to resolve the problem that the timing controller cannot be directly matched with different gate driving chips in use.

BRIEF DESCRIPTION OF THE DRAWINGS

In order to more clearly illustrate the technical solutions in embodiments of the present disclosure, the accompanying drawings depicted in the description of the embodiments will be briefly described below. It will be apparent that the accompanying drawings in the following description are merely some embodiments of the present disclosure, and other drawings may be obtained from these drawings without creative effort by those skilled in the art.

EMBODIMENTS OF THE PRESENT DISCLOSURE

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

In the description of the present disclosure, it should be understood that the term "first", "second" are for illustrative purposes only and are not to be construed as indicating or imposing a relative importance or implicitly indicating the number of technical features indicated. Thus, a feature that limited by "first" or "second" may expressly or implicitly include at least one of the features. In the description of the present disclosure, the meaning of "plurality" is two or more, unless otherwise specifically defined.

The transistors used in all embodiments of the present disclosure may be thin film transistors, field effect transistors, or other devices with same characteristics. Since a source and a drain of the transistor used herein are disposed symmetrically, the source and drain of the transistor may be interchanged. In an embodiment of the present disclosure, to distinguish between two poles of a transistor except the gate, one of the two poles is referred to as a source, and another is referred to as a drain. It is provided as shown in drawings that a middle terminal of a control module represents a gate, a signal input terminal thereof represents a source, and an output terminal thereof is a drain. In addition, the transistors used in the embodiments of present disclosure may include a P-type transistor and/or an N-type transistor. The P-type transistor is turned on when a gate of the P-type transistor is at a low level, and is turned off when the gate is at a high level. The N-type transistor is turned on when a gate of the N-type transistor is at a high level, and is turned off when the gate is at a low level.

The present disclosure provides a driving circuit and a display device, which are described in detail below. It should be noted that the description order of the following embodiments of the present disclosure is not intended to limit the preferred order of the embodiments.

Figure 1:
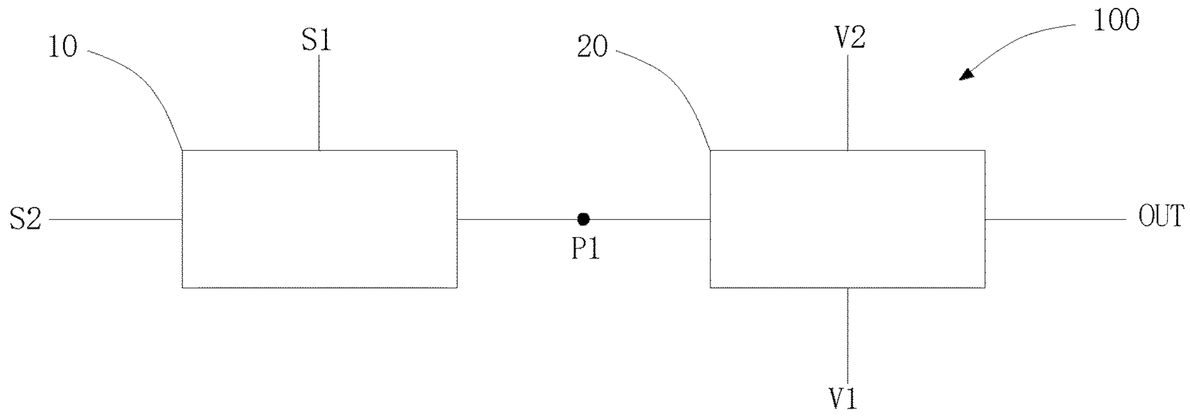
FIG. 1 is a first schematic structural view of a driving circuit according to the present disclosure.

Please refer to FIG. 1, which is a first schematic structural view of a driving circuit 100 according to the present disclosure. The present disclosure provides a driving circuit 100 including an input module 10 and an output module 20.

The input module 10 may be connected to a first signal control terminal S1, a second signal control terminal S2, and a first node P1, respectively, and configured to input a level signal to the first node P1 under the control of the first signal control terminal S1 and the second signal control terminal S2.

The output module 20 may be connected to a first power supply terminal V1, a second power supply terminal V2, the first node P1, and an output terminal OUT, respectively, and configured to output a signal of the first power supply terminal V1 or the second power supply terminal V2 to the output terminal OUT under the control of the level signal of the first node P1.

Specifically, in an operation process, the input module 10 may be configured to input a level signal to the first node P1 under the control of the first signal control terminal S1 and the second signal control terminal S2, where the level signal of the first node P1 may be a high level or a low level. Then, the output module 20 may output a signal of the first power supply terminal V1 or the second power supply terminal V2 to the output terminal OUT under the control of the level signal of the first node P1, where the signal of the first power supply terminal V1 is one of a high level and a low level, and the signal of the second power supply terminal V2 is another of the high level and the low level. In practice, a timing controller is connected to the first signal control terminal S1 and the second signal control terminal S2, and a gate driving chip is connected to the output terminal OUT. Then, values of level signals of the first power supply terminal V1 and the second power supply terminal V2 are set. Therefore, the timing controller outputs an accurate control signal to the gate driving chip via the output terminal OUT, so as to resolve a problem that the timing controller cannot be directly matched with different gate driving chips in use.

Figure 2:
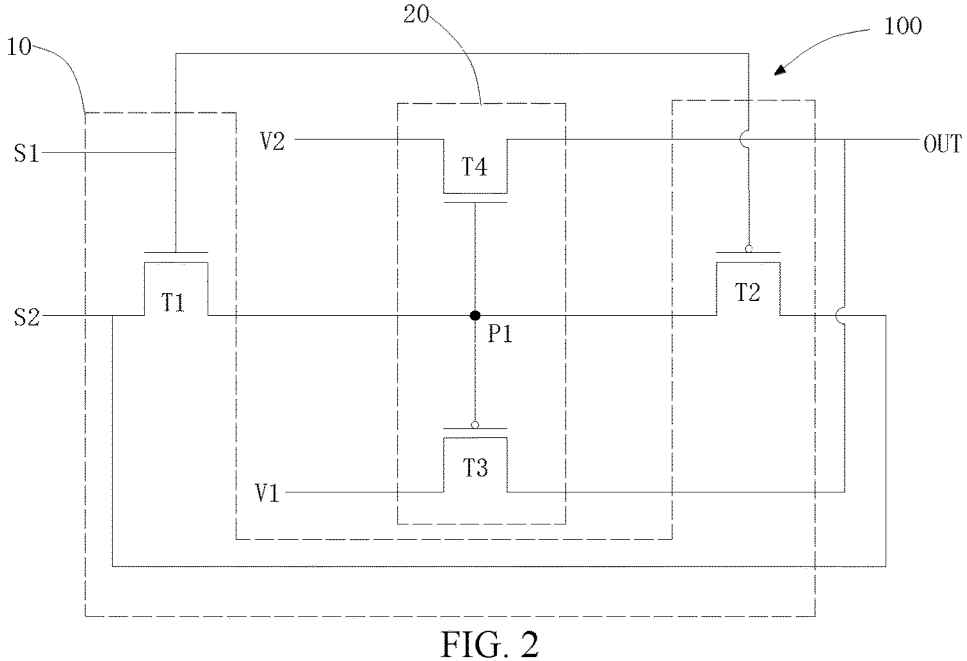
FIG. 2 is a second schematic structural view of a driving circuit according to the present disclosure.

Please refer to FIG. 2, which is a second schematic structural view of a driving circuit 100 according to the present disclosure. The input module 10 includes a first transistor T1 and a second transistor T2, where a gate of the first transistor T1 is connected to the first signal control terminal S1, one of a source and a drain of the first transistor T1 is connected to the second signal control terminal S2, and another of the source electrode and the drain electrode of the first transistor T1 is connected to the first node P1; a gate of the second transistor T2 is connected to the first signal control terminal S1, one of a source and a drain of the second transistor T2 is connected to the second signal control terminal S2, and another of the source electrode and the drain electrode of the second transistor T2 is connected to the first node P1; and the first transistor T1 is one of a P-type transistor and an N-type transistor, and the second transistor T2 is another of the P-type transistor and the N-type transistor.

That is, the first transistor T1 is one of a P-type transistor and an N-type transistor, and the second transistor T2 is another of the P-type transistor and the N-type transistor, so that different level signals can be alternately outputted to the first node P1 under the control of the first signal control terminal S1 and the second signal control terminal S2 by adopting different types of transistors for the first transistor T1 and the second transistor T2. Meanwhile, the first transistor T1 and the second transistor T2 are alternately turned on instead of continuous operation, so that a lifetime of the transistors can be improved.

In some embodiments, the output module 20 includes a third transistor T3 and a fourth transistor T4, where a gate of the third transistor T3 is connected to the first node P1, one of a source and a drain of the third transistor T3 is connected to the first power supply terminal V1, and another of the source electrode and the drain electrode of the third transistor T3 is connected to the output terminal OUT; a gate of the fourth transistor T4 is connected to the first node P1, one of a source and a drain of the fourth transistor T4 is connected to the second power supply terminal V2, and another of the source electrode and the drain electrode of the fourth transistor T4 is connected to the output terminal OUT; and the third transistor T3 is one of a P-type transistor and an N-type transistor, and the fourth transistor T4 is another of the P-type transistor and the N-type transistor.

That is, the third transistor T3 is one of a P-type transistor and an N-type transistor, and the fourth transistor T4 is another of the P-type transistor and the N-type transistor, so that the third transistor T3 or the fourth transistor T4 can be turned on according to a high level signal or a low level signal of the first node P1 by adopting different types of transistors for the first transistor T3 and the second transistor T4, thereby outputting a signal of the first power supply terminal V1 or the second power supply terminal V2 to the output terminal OUT. Meanwhile, the third transistor T3 and the fourth transistor T4 are alternately turned on instead of continuous operation, so that a lifetime of the transistors can be improved.

Specifically, in the embodiment, the first transistor T1 is an N-type transistor, the second transistor T2 is a P-type transistor, the third transistor T3 is a P-type transistor, and the fourth transistor T4 is an N-type transistor. The first power supply terminal V1 is connected to a high level signal, and the second power supply terminal V2 is connected to a low level signal.

In the embodiment, a specific operation process is as follows: if level signals of both the first signal control terminal S1 and the second signal control terminal S2 are high level signals, then the first transistor T1 is turned on and the second transistor T2 is turned off, so that the high level signal of the second signal control terminal S2 is transmitted to the first node P1 via the first transistor T1, which enables the fourth transistor T4 to be turned on so that the low level signal of the second power supply terminal V2 is transmitted to the output terminal OUT via the fourth transistor T4; if both the signals of both the first signal control terminal S1 and the second signal control terminal S2 are low level signals, then the first transistor T1 is turned off and the second transistor T2 is turned on, so that the low level signal of the second signal control terminal S2 is transmitted to the first node P1 via the second transistor T2, which enables the third transistor T3 to be turned on so that the high level signal of the first power supply terminal V1 is transmitted to the output terminal OUT via the third transistor T3; if the signal of the first signal control terminal S1 is a high level signal and the signal of the second signal control terminal S2 is a low level signal, then the first transistor T1 is turned on and the second transistor T2 is turned off, so that the low level signal of the second signal control terminal S2 is transmitted to the first node P1 via the first transistor T1, which enables the third transistor T3 to be turned on so that the high level signal of the first power supply terminal V1 is transmitted to the output terminal OUT via the third transistor T3; and if the signal of the first signal control terminal S1 is a low level signal and the signal of the second signal control terminal S2 is a high level signal, then the first transistor T1 is turned off and the second transistor T2 is turned on, so that the high level signal of the second signal control terminal S2 is transmitted to the first node P1 via the second transistor T2, which enables the fourth transistor T4 to be turned on so that the low level signal of the second power supply terminal V2 is transmitted to the output terminal OUT via the fourth transistor T4.

Figure 3:
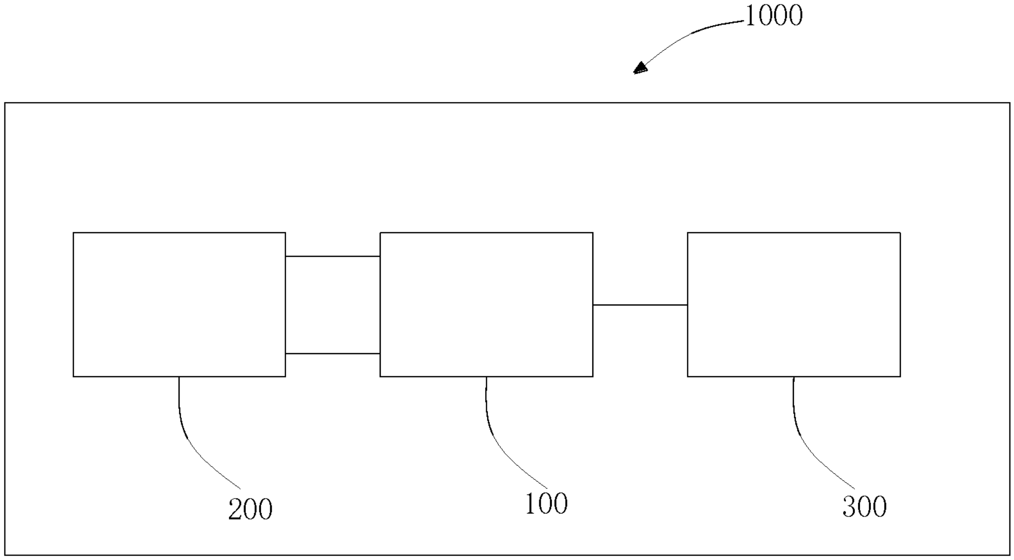
FIG. 3 is a schematic diagram of a display device according to the present disclosure.

Please refer to FIG. 3, which is a schematic diagram of a display device according to the present disclosure. An embodiment of the present disclosure further provides a display device 1000, including the driving circuit 100 described above.

The display device 1000 further includes a timing controller 200 connected to the first signal control terminal S1 and the second signal control terminal S2 of the driving circuit 100, and a gate driving chip 300 connected to an output terminal OUT of the driving circuit 100.

The timing controller 200 of the present disclosure outputs an accurate control signal to the gate driving chip 300 via the output terminal OUT, so as to resolve a problem that the timing controller cannot be directly matched with different gate driving chips in use.

A principle of the display device for resolving the problem is similar to that of the driving circuit 100. Therefore, implementations and beneficial effects of the display device can refer to the description of the driving circuit 100. Details are not described herein repeatedly.

Figure 4:
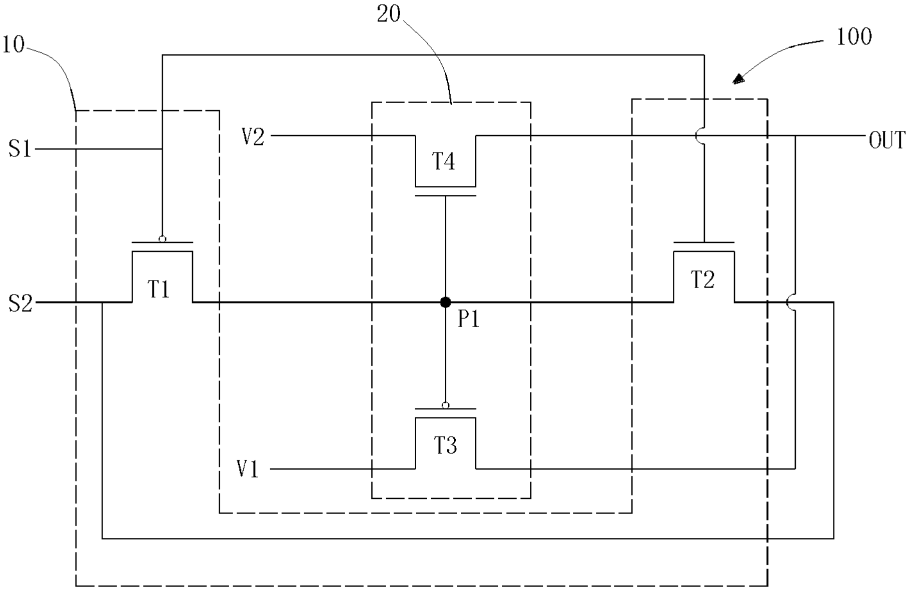
FIG. 4 is a third schematic structural view of a driving circuit according to the present disclosure.

Please refer to FIG. 4, which is a third schematic structural view of a driving circuit 100 according to the present disclosure. In other embodiments of the present disclosure, the first transistor T1 is a P-type transistor, the second transistor T2 is an N-type transistor, the third transistor T3 is a P-type transistor, and the fourth transistor T4 is an N-type transistor.

Figure 5:
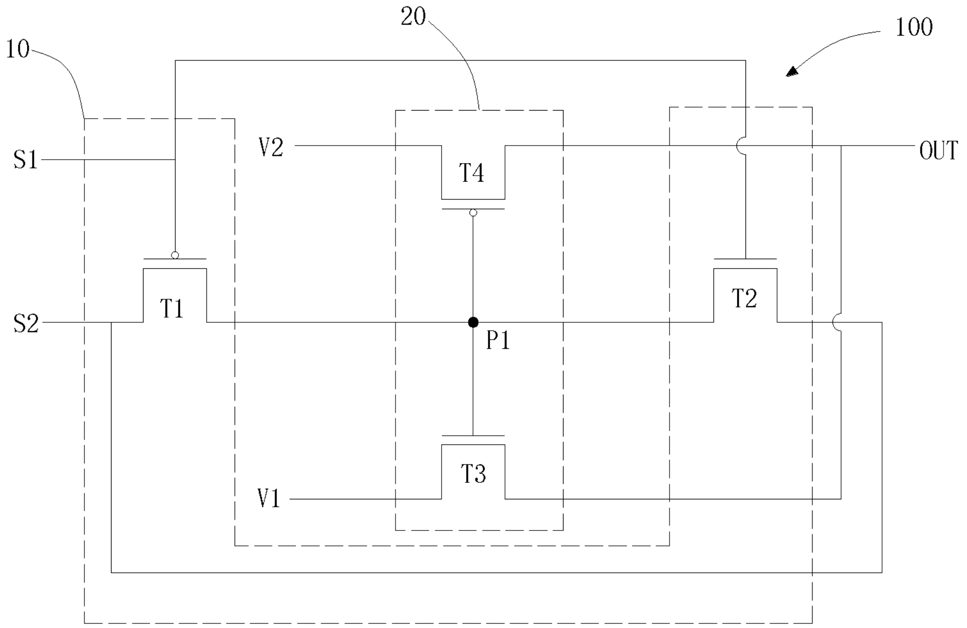
FIG. 5 is a fourth schematic structural view of a driving circuit according to the present disclosure.

Please refer to FIG. 5, which is a fourth schematic structural view of a driving circuit 100 according to the present disclosure. In other embodiments of the present disclosure, the first transistor T1 is a P-type transistor, the second transistor T2 is an N-type transistor, the third transistor T3 is an N-type transistor, and the fourth transistor T4 is a P-type transistor.

Figure 6:
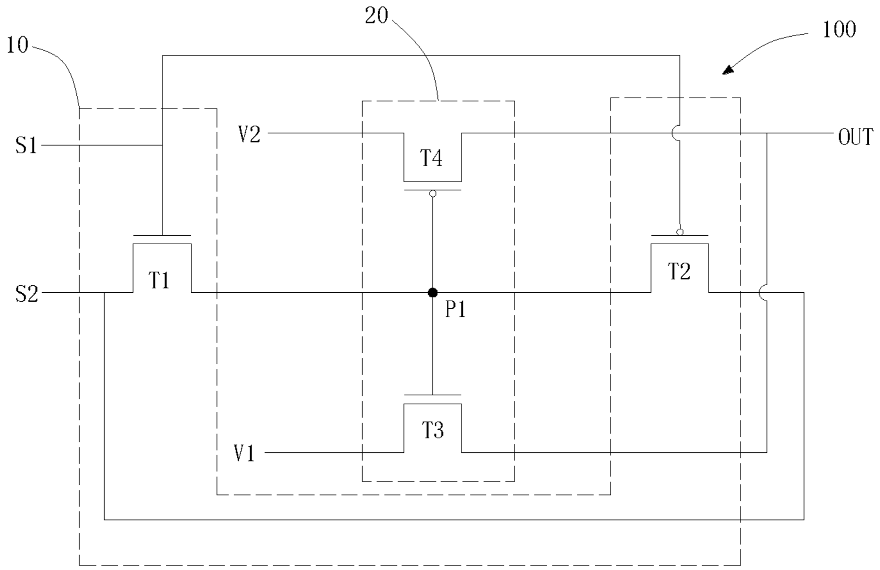
FIG. 6 is a fifth schematic structural view of a driving circuit according to the present disclosure.

Please refer to FIG. 6, which is a fifth schematic structural view of a driving circuit 100 according to the present disclosure. In other embodiments of the present disclosure, the first transistor T1 is an N-type transistor, the second transistor T2 is a P-type transistor, the third transistor T3 is an N-type transistor, and the fourth transistor T4 is a P-type transistor.

Figure 7:
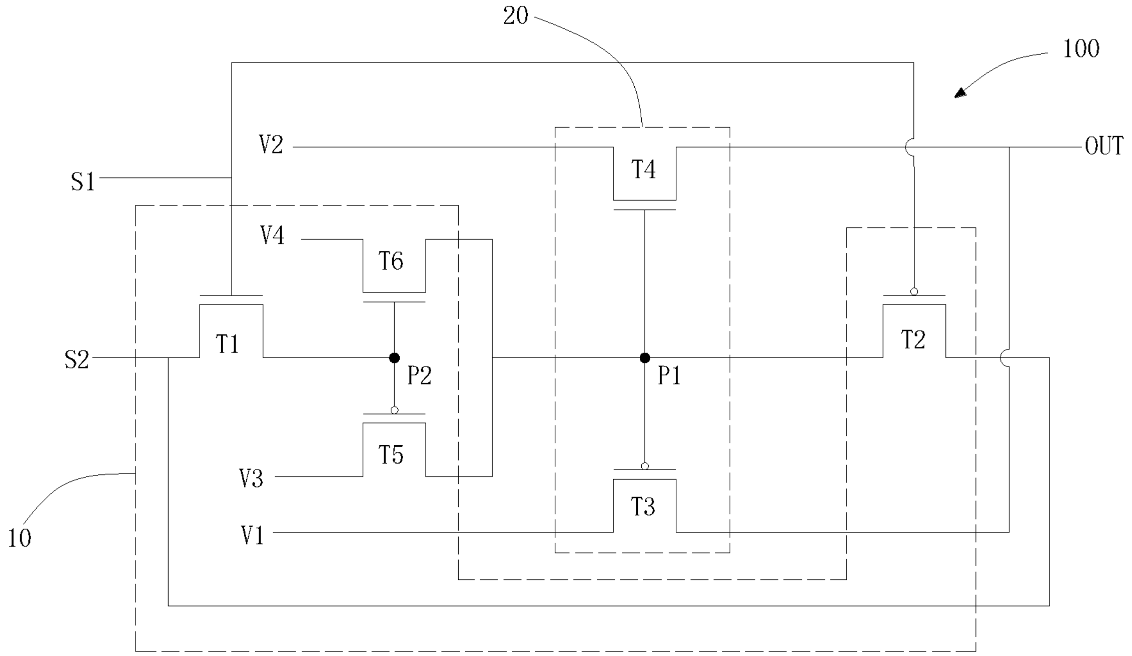
FIG. 7 is a sixth schematic structural view of a driving circuit according to the present disclosure.

Please refer to FIG. 7, which is a sixth schematic structural view of a driving circuit 100 according to the present disclosure. The embodiment is different from that of the driving circuit 100 shown in FIG. 1 in that, in some embodiments of the present disclosure, the input module 10 further includes a fifth transistor T5 and a sixth transistor T6, where a gate of the fifth transistor T5 is connected to a second node P2, one of a source and a drain of the fifth transistor T5 is connected to a third power supply terminal V3, and another of the source electrode and the drain electrode of the fifth transistor T5 is connected to the first node P1; a gate of the sixth transistor T6 is connected to the second node P2, one of a source and a drain of the sixth transistor T6 is connected to a fourth power supply terminal V4, and another of the source electrode and the drain electrode of the sixth transistor T6 is connected to the first node P1; and another of the source electrode and the drain electrode of the first transistor T1 is connected to the second node P2, the fifth transistor T5 is one of a P-type transistor and an N-type transistor, and the sixth transistor T6 is another of the P-type transistor and the N-type transistor.

That is, the fifth transistor T5 is one of a P-type transistor and an N-type transistor, and the sixth transistor T6 is another of the P-type transistor and the N-type transistor, so that the fifth transistor T5 or the sixth transistor T6 can be turned on according to a high level signal or a low level signal of the second node P2 by adopting different types of transistors for the fifth transistor T5 and the sixth transistor T6, thereby outputting different level signals to the first node P1 alternatively. Meanwhile, the fifth transistor T5 and the sixth transistor T6 are alternately turned on instead of continuous operation, so that a lifetime of the transistors can be improved.

Specifically, in the embodiment, the fifth transistor T5 is an N-type transistor, and the sixth transistor T6 is a P-type transistor. The signals of the first power supply terminal V1 and the third power supply terminal V3 are the high level signals, and the signals of the second power supply terminal V2 and the fourth power supply terminal V4 are the low level signals.

In the embodiment, a specific operation process is as follows: if signals of both the first signal control terminal S1 and the second signal control terminal S2 are high level signals, then the first transistor T1 is turned on and the second transistor T2 is turned off, so that the high level signal of the second signal control terminal S2 is transmitted to the second node P2 via the first transistor T1, which enables the sixth transistor T6 to be turned on so that the low level signal of the fourth power supply terminal V4 is transmitted to the first node P1 via the sixth transistor T6, which in turn enables the third transistor T3 to be turned on, so that the high level signal of the first power supply terminal V1 is transmitted to the output terminal OUT via the third transistor T3; if both the signals of both the first signal control terminal S1 and the second signal control terminal S2 are low level signals, then the first transistor T1 is turned off and the second transistor T2 is turned on, so that the low level signal of the second signal control terminal S2 is transmitted to the first node P1 via the second transistor T2, which enables the third transistor T3 to be turned on so that the high level signal of the first power supply terminal V1 is transmitted to the output terminal OUT via the third transistor T3; if the signal of the first signal control terminal S1 is a high level signal and the signal of the second signal control terminal S2 is a low level signal, then the first transistor T1 is turned on and the second transistor T2 is turned off, so that the low level signal of the second signal control terminal S2 is transmitted to the second node P2 via the first transistor T1, which enables the fifth transistor T5 to be turned on so that the high level signal of the third power supply terminal V3 is transmitted to the first node P1 via the fifth transistor T5, which in turn enables the fourth transistor T4 to be turned on so that the low level signal of the second power supply terminal V2 is transmitted to the output terminal OUT via the fourth transistor T4; and if the signal of the first signal control terminal S1 is a low level signal, the signal of the second signal control terminal S2 is a high level signal, the signal of the first signal control terminal S1 is a low level signal, and the signal of the second signal control terminal S2 is a high level signal, then the first transistor T1 is turned off and the second transistor T2 is turned on, so that the high level signal of the second signal control terminal S2 is transmitted to the first node P1 via the second transistor T2, which enables the fourth transistor T4 to be turned on so that the low level signal of the second power supply terminal V2 is transmitted to the output terminal OUT via the fourth transistor T4.

Figure 8:
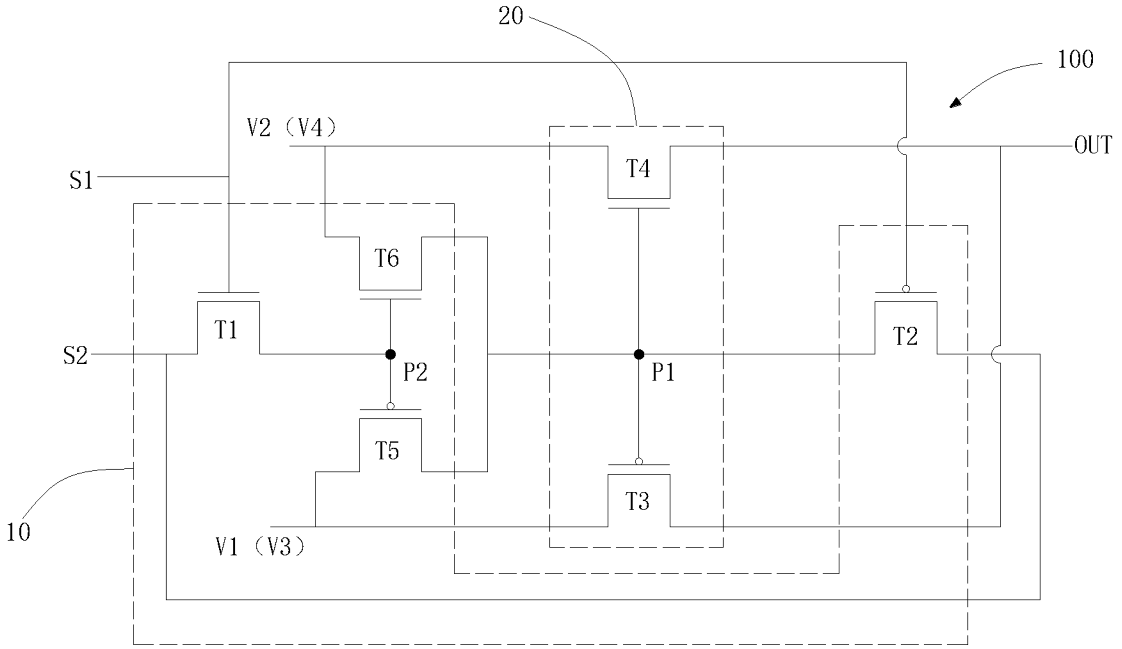
FIG. 8 is a seventh schematic structural view of a driving circuit according to the present disclosure.

Please refer to FIG. 8, which is a seventh schematic structural view of a driving circuit 100 according to an embodiment of the present disclosure. In some embodiments of the present disclosure, the first power supply terminal V1 and the third power supply terminal V3 are the same power supply terminal; and the second power supply terminal V2 and the fourth power supply terminal V4 are the same power supply terminal.

Figure 9:
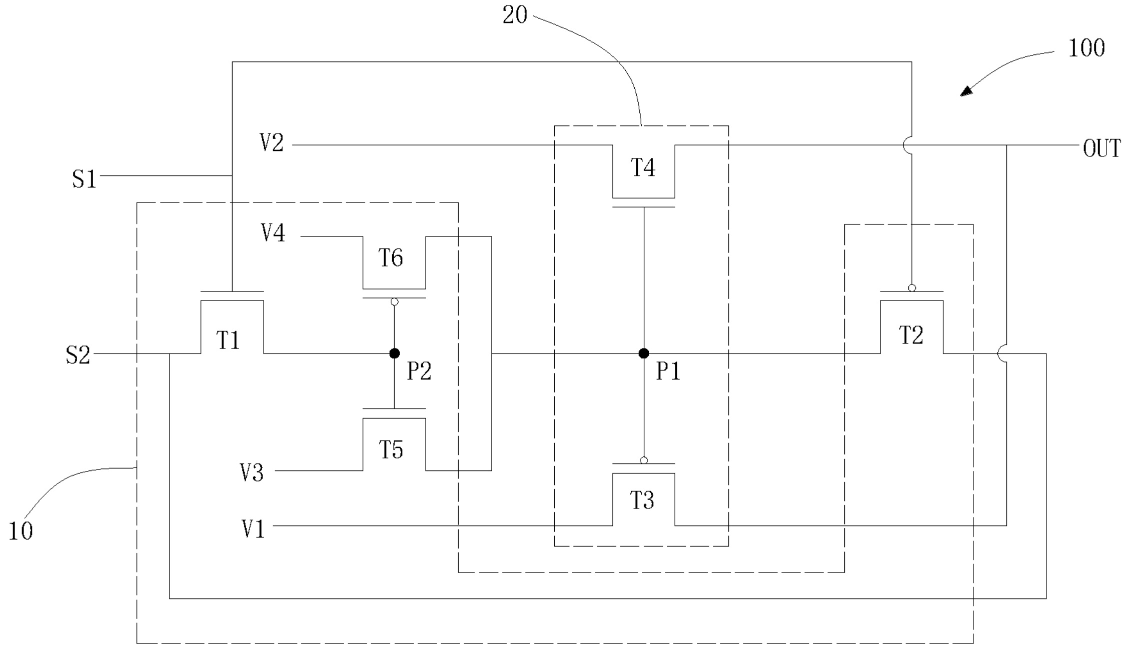
FIG. 9 is an eighth schematic structural view of a driving circuit according to the present disclosure.

Please refer to FIG. 9, which is an eighth schematic structural view of a driving circuit 100 according to the present disclosure. In other embodiments of the present disclosure, the fifth transistor T5 is a P-type transistor, and the sixth transistor T6 is an N-type transistor.

In other embodiments of the present disclosure, the signals of the first power supply terminal V1 and the third power supply terminal V3 are the low level signals, and the signals of the second power supply terminal V2 and the fourth power supply terminal V4 are the high level signals. The first power supply terminal V1 and the third power supply terminal V3 are the same power supply terminal; and the second power supply terminal V2 and the fourth power supply terminal V4 are the same power supply terminal.

Figure 10:
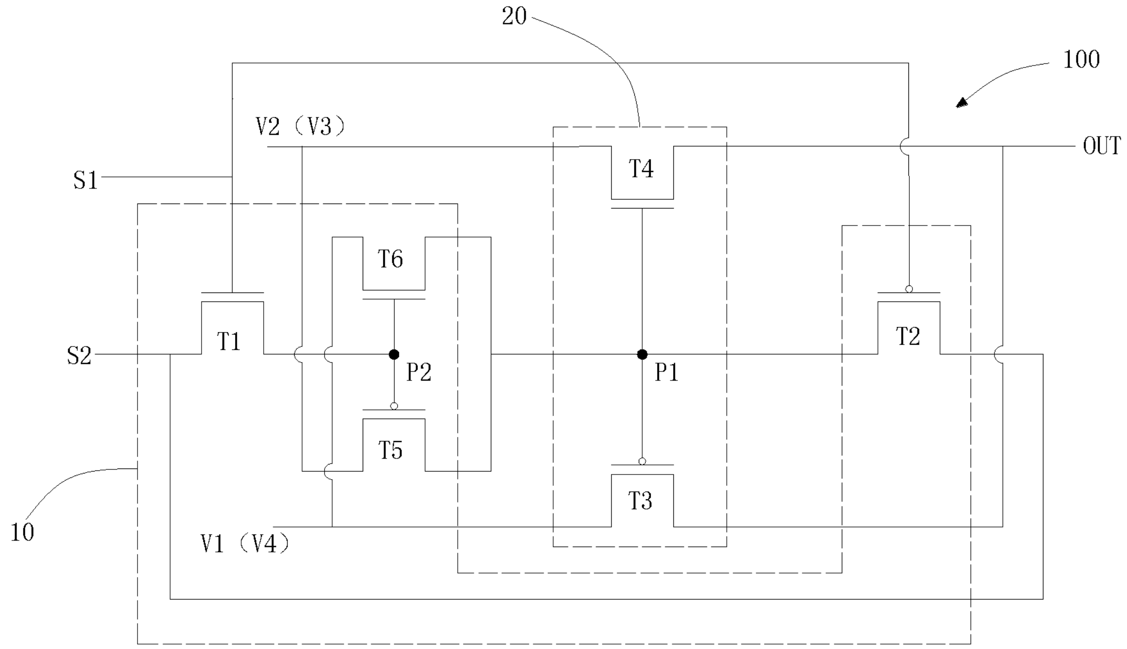
FIG. 10 is a ninth schematic structural view of a driving circuit according to the present disclosure.

Please refer to FIG. 10, which is a ninth schematic structural view of a driving circuit 100 according to the present disclosure. In other embodiments of the present disclosure, the signals of the first power supply terminal V1 and the fourth power supply terminal V4 are the low level signals, and the signals of the second power supply terminal V2 and the third power supply terminal V3 are the high level signals. The first power supply terminal V1 and the fourth power supply terminal V4 are the same power supply terminal; and the second power supply terminal V2 and the third power supply terminal V3 are the same power supply terminal.

In other embodiments of the present disclosure, the signals of the first power supply terminal V1 and the fourth power supply terminal V4 are the high level signals, and the signals of the second power supply terminal V2 and the third power supply terminal V3 are the low level signals. In some embodiments of the present disclosure, the first power supply terminal V1 and the fourth power supply terminal V4 are the same power supply terminal; and the second power supply terminal V2 and the third power supply terminal V3 are the same power supply terminal.

Figure 11:
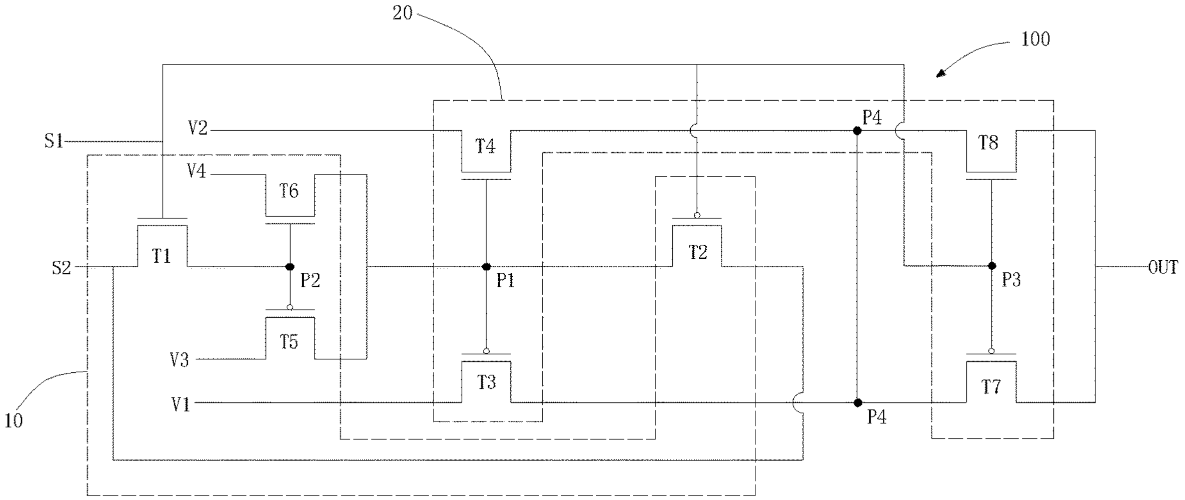
FIG. 11 is a tenth schematic structural view of a driving circuit according to the present disclosure.

Please refer to FIG. 11, which is a tenth schematic structural view of a driving circuit 100 according to the present disclosure. The embodiment is different from that of the driving circuit 100 shown in FIG. 7 in that the output module 20 further includes a seventh transistor T7 and an eighth transistor T8, where a gate of the seventh transistor T7 is connected to a third node P3, one of a source and a drain of the seventh transistor T7 is connected to a fourth node P4, and another of the source electrode and the drain electrode of the seventh transistor T7 is connected to the output terminal OUT; a gate of the eighth transistor T8 is connected to the third node P3, one of a source and a drain of the eighth transistor T8 is connected to the fourth node P4, and another of the source electrode and the drain electrode of the eight transistor T8 is connected to the output terminal OUT; another of the source electrode and the drain electrode of the third transistor T3 is connected to the fourth node P4, and another of the source electrode and the drain electrode of the fourth transistor T4 is connected to the fourth node P4; and the first signal control terminal S1 is connected to the third node P3, the seventh transistor T7 is one of a P-type transistor and an N-type transistor, and the eighth transistor T8 is another of the P-type transistor and the N-type transistor.

That is, in the embodiment, the seventh transistor T7 and the eighth transistor T8 are connected between the fourth node P4 and the output terminal OUT, the seventh transistor T7 is one of a P-type transistor and an N-type transistor, and the eighth transistor T8 is another of the P-type transistor and the N-type transistor, so that the first signal control terminal S1 can control the seventh transistor T7 or the eighth transistor T8 to be turned on via the first signal control terminal S1, thereby outputting the signal of the first power supply terminal V1 or the second power supply terminal V2 to the output terminal OUT.

Specifically, the seventh transistor T7 is a P-type transistor, and the eighth transistor T8 is an N-type transistor. The signals of the first power supply terminal V1 and the third power supply terminal V3 are the high level signals, and the signals of the second power supply terminal V2 and the fourth power supply terminal V4 are the low level signals.

In the embodiment, a specific operation process is as follows: if signals of both the first signal control terminal S1 and the second signal control terminal S2 are high level signals, then the first transistor T1 is turned on, the second transistor T2 is turned off, the seventh transistor T7 is turned off, and the eighth transistor T8 is turned on, so that the high level signal of the second signal control terminal S2 is transmitted to the second node P2 via the first transistor T1, which enables the sixth transistor T6 to be turned on so that the low level signal of the fourth power supply terminal V4 is transmitted to the first node P1 via the sixth transistor T6, which in turn enables the third transistor T3 to be turned on, so that the high level signal of the first power supply terminal V1 is transmitted to the fourth node P4 via the third transistor T3 and the high level signal of the first power supply V1 is transmitted to the output terminal OUT via the eighth transistor T8;

if both the signals of both the first signal control terminal S1 and the second signal control terminal S2 are low level signals, then the first transistor T1 is turned off, the second transistor T2 is turned on, the seventh transistor T7 is turned on, and the eighth transistor T8 is turned off, so that the low level signal of the second signal control terminal S2 is transmitted to the first node P1 via the second transistor T2, which enables the third transistor T3 to be turned on, so that the high level signal of the first power supply terminal V1 is transmitted to the fourth node P4 via the third transistor T3 and the high level signal of the first power supply terminal V1 is transmitted to the output terminal OUT via the seventh transistor T7;

- if the signal of the first signal control terminal S1 is a high level signal and the signal of the second signal control terminal S2 is a low level signal, then the first transistor T1 is turned on, the second transistor T2 is turned off, the seventh transistor T7 is turned off, and the eighth transistor T8 is turned on, so that the low level signal of the second signal control terminal S2 is transmitted to the second node P2 via the first transistor T1, which enables the fifth transistor T5 to be turned on, so that the high level signal of the third power supply terminal V3 is transmitted to the first node P1 via the fifth transistor T5, which in turn enables the fourth transistor T4 to be turned on, so that the low level signal of the second power supply terminal V2 is transmitted to the fourth node P4 via the fourth transistor T4 and the low level signal of the second power supply V2 is transmitted to the output terminal OUT via the eighth transistor T8; and
- if the signal of the first signal control terminal S1 is a low level signal and the signal of the second signal control terminal S2 is a high level signal, then the first transistor T1 is turned off, the second transistor T2 is turned on, the seventh transistor T7 is turned on, and the eighth transistor T8 is turned off, so that the high level signal of the second signal control terminal S2 is transmitted to the first node P1 via the second transistor T2, which enables the fourth transistor T4 to be turned on, so that the low level signal of the second power supply terminal V2 is transmitted to the fourth node P4 and the low level signal of the second power supply terminal V2 is transmitted to the output terminal OUT via the seventh transistor T7.

Figure 12:
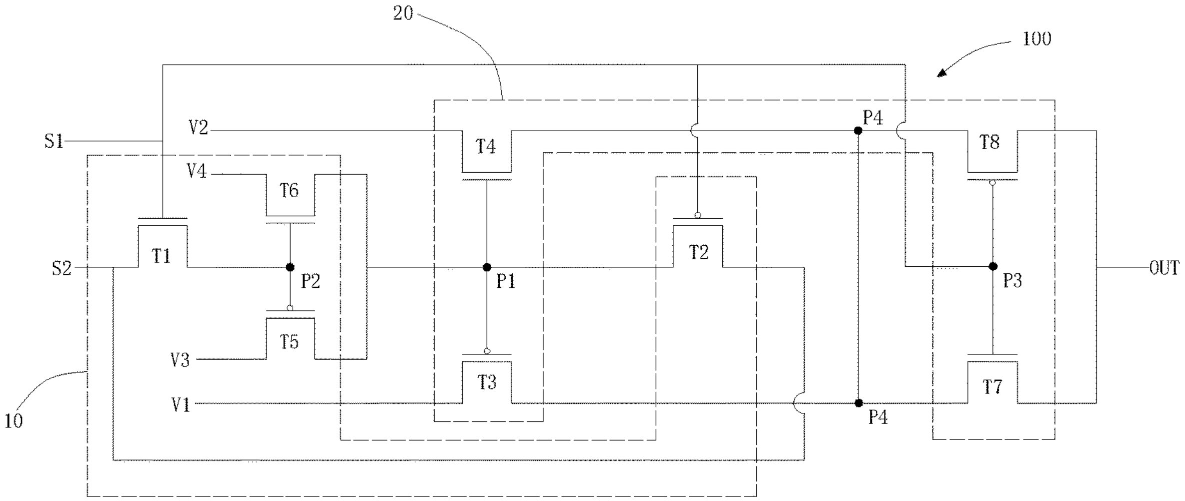
FIG. 12 is an eleventh schematic structural view of a driving circuit according to the present disclosure.

Please refer to FIG. 12, which is an eleventh schematic structural view of a driving circuit 100 according to the present disclosure. In other embodiments of the present disclosure, the seventh transistor T7 is an N-type transistor, and the eighth transistor T8 is a P-type transistor.

Figure 13:
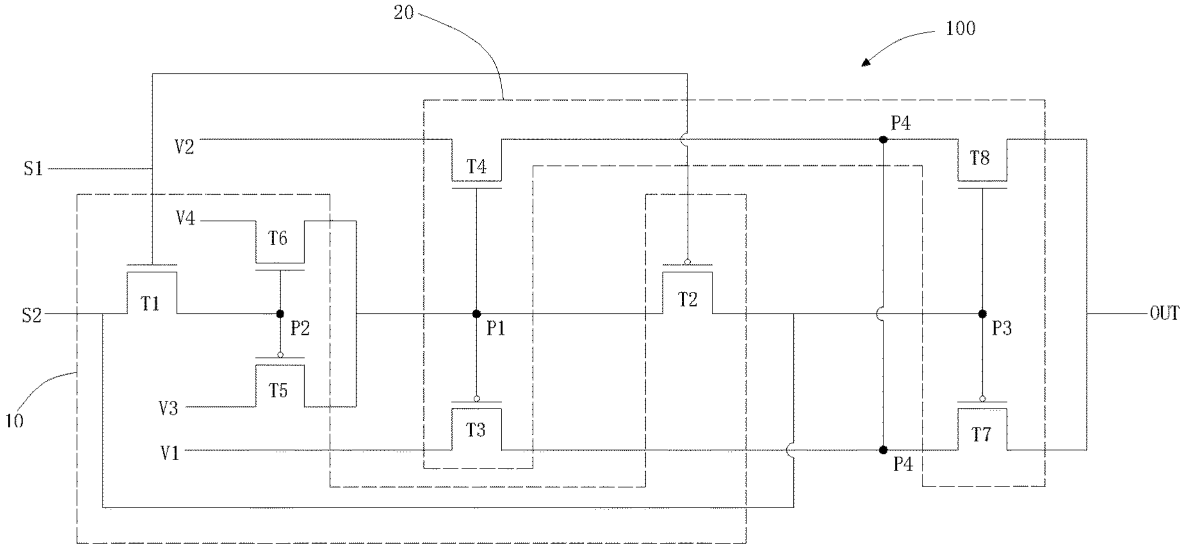
FIG. 13 is a twelfth schematic structural view of a driving circuit according to the present disclosure.

Please refer to FIG. 13, which is a twelfth schematic structural view of a driving circuit 100 according to the present disclosure. The embodiment is different from that of the driving circuit 100 shown in FIG. 7 in that the output module 20 further includes a seventh transistor T7 and an eighth transistor T8, where a gate of the seventh transistor T7 is connected to a third node P3, one of a source and a drain of the seventh transistor T7 is connected to a fourth node P4, and another of the source electrode and the drain electrode of the seventh transistor T7 is connected to the output terminal OUT; a gate of the eighth transistor T8 is connected to the third node P3, one of a source and a drain of the eighth transistor T8 is connected to the fourth node P4, and another of the source electrode and the drain electrode of the eighth transistor T8 is connected to the output terminal OUT; another of the source electrode and the drain electrode of the third transistor T3 is connected to the fourth node P4, and another of the source electrode and the drain electrode of the fourth transistor T4 is connected to the fourth node P4; and the second signal control terminal S2 is connected to the third node P3, the seventh transistor T7 is one of a P-type transistor and an N-type transistor, and the eighth transistor T8 is another of the P-type transistor and the N-type transistor.

That is, in the embodiment, the seventh transistor T7 and the eighth transistor T8 are connected between the fourth node P4 and the output terminal OUT, the seventh transistor T7 is one of a P-type transistor and an N-type transistor, and the eighth transistor T8 is another of the P-type transistor and the N-type transistor, so that the first signal control terminal S1 can control the seventh transistor T7 or the eighth transistor T8 to be turned on via the second signal control terminal S2, thereby outputting the signal of the first power supply terminal V1 or the second power supply terminal V2 to the output terminal OUT.

Specifically, the seventh transistor T7 is a P-type transistor, and the eighth transistor T8 is an N-type transistor. The signals of the first power supply terminal V1 and the third power supply terminal V3 are the high level signals, and the signals of the second power supply terminal V2 and the fourth power supply terminal V4 are the low level signals.

In the embodiment, a specific operation process is as follows: if signals of both the first signal control terminal S1 and the second signal control terminal S2 are high level signals, then the first transistor T1 is turned on, the second transistor T2 is turned off, the seventh transistor T7 is turned off, and the eighth transistor T8 is turned on, so that the high level signal of the second signal control terminal S2 is transmitted to the second node P2 via the first transistor T1, which enables the sixth transistor T6 to be turned on so that the low level signal of the fourth power supply terminal V4 is transmitted to the first node P1 via the sixth transistor T6, which in turn enables the third transistor T3 to be turned on, so that the high level signal of the first power supply terminal V1 is transmitted to the fourth node P4 via the third transistor T3 and the high level signal of the first power supply V1 is transmitted to the output terminal OUT via the eighth transistor T8;

- if both the signals of both the first signal control terminal S1 and the second signal control terminal S2 are low level signals, then the first transistor T1 is turned off, the second transistor T2 is turned on, the seventh transistor T7 is turned on, and the eighth transistor T8 is turned off, so that the low level signal of the second signal control terminal S2 is transmitted to the first node P1 via the second transistor T2, which enables the third transistor T3 to be turned on so that the high level signal of the first power supply terminal V1 is transmitted to the fourth node P4 via the third transistor T3 and the high level signal of the first power supply terminal V1 is transmitted to the output terminal OUT via the seventh transistor T7;
- if the signal of the first signal control terminal S1 is a high level signal and the signal of the second signal control terminal S2 is a low level signal, then the first transistor T1 is turned on, the second transistor T2 is turned off, the seventh transistor T7 is turned on, and the eighth transistor T8 is turned off, so that the low level signal of the second signal control terminal S2 is transmitted to the second node P2 via the first transistor T1, which enables the fifth transistor T5 to be turned on so that the high level signal of the third power supply terminal V3 is transmitted to the first node P1 via the fifth transistor T5, which in turn enables the fourth transistor T4 to be turned on, so that the low level signal of the second power supply terminal V2 is transmitted to the fourth node P4 via the fourth transistor T4 and the low level signal of the second power supply V2 is transmitted to the output terminal OUT via the seventh transistor T7; and if the signal of the first signal control terminal S1 is a low level signal and the signal of the second signal control terminal S2 is a high level signal, then the first transistor T1 is turned off, the second transistor T2 is turned on, the seventh transistor T7 is turned off, and the eighth transistor T8 is turned on, so that the high level signal of the second signal control terminal S2 is transmitted to the first node P1 via the second transistor T2, which enables the fourth transistor T4 to be turned on so that the low level signal of the second power supply terminal V2 is transmitted to the fourth node P4 via the fourth transistor T4 and the low level signal of the second power supply terminal V2 is transmitted to the output terminal OUT via the eighth transistor T8.

Figure 14:
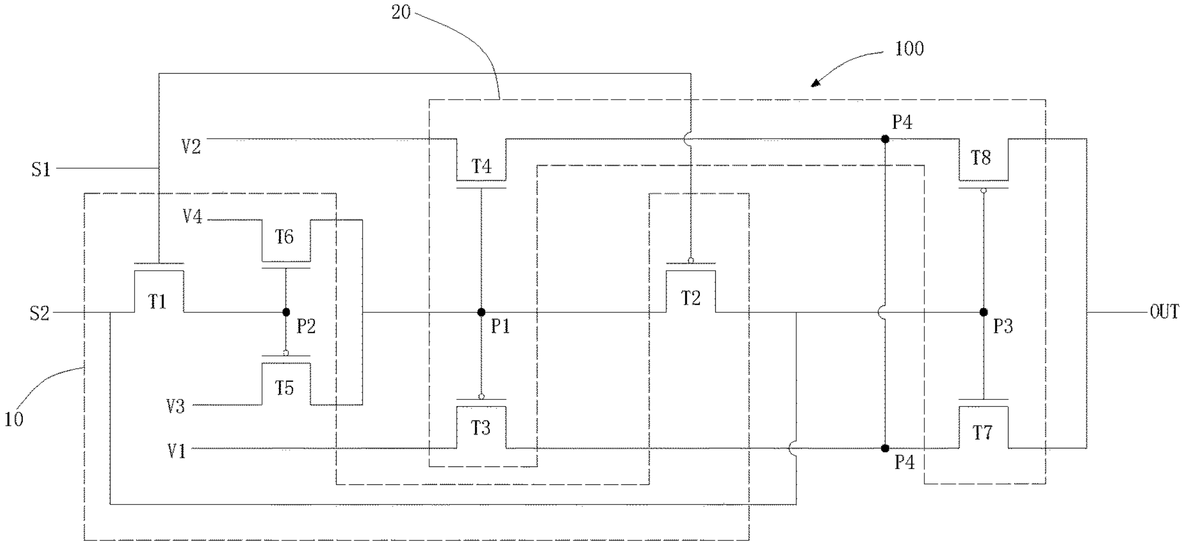
FIG. 14 is a thirteenth schematic structural view of a driving circuit according to the present disclosure.

Please refer to FIG. 14, which is a thirteenth schematic structural view of a driving circuit 100 according to the present disclosure. In other embodiments of the present disclosure, the seventh transistor T7 is an N-type transistor, and the eighth transistor T8 is a P-type transistor.

The driving circuit and the display device provided in the embodiments of the present disclosure are described in detail above. A specific example is used herein to describe a principle and an implementation of the present disclosure. The description of the foregoing embodiments is merely used to help understand a method and a core idea of the present disclosure. In addition, a person skilled in the art may make changes in a specific implementation manner and an application scope according to an idea of the present disclosure. In conclusion, content of this specification should not be construed as a limitation on the present disclosure.

What is claimed is:

1. A driving circuit, comprising:

an input module connected to a first signal control terminal, a second signal control terminal, and a first node, respectively, for inputting a level signal to the first node under the control of the first signal control terminal and the second signal control terminal; and an output module connected to a first power supply terminal, a second power supply terminal, the first node, and an output terminal, respectively, for outputting a signal of the first power supply terminal or the second power supply terminal to the output terminal under the control of the level signal of the first node.

2. The driving circuit of claim 1, wherein the input module includes:

a first transistor, wherein a gate of the first transistor is connected to the first signal control terminal, one of a source and a drain of the first transistor is connected to the second signal control terminal, and another of the source electrode and the drain electrode of the first transistor is connected to the first node; and a second transistor, wherein a gate of the second transistor is connected to the first signal control terminal, one of a source and a drain of the second transistor is connected to the second signal control terminal, and another of the source electrode and the drain electrode of the second transistor is connected to the first node;

wherein the first transistor is one of a P-type transistor and an N-type transistor, and the second transistor is another of the P-type transistor and the N-type transistor.

3. The driving circuit of claim 2, wherein the input module further includes:

a fifth transistor, wherein a gate of the fifth transistor is connected to a second node, one of a source and a drain of the fifth transistor is connected to a third power supply terminal, and another of the source electrode and the drain electrode of the fifth transistor is connected to the first node; and a sixth transistor, wherein a gate of the sixth transistor is connected to the second node, one of a source and a drain of the sixth transistor is connected to a fourth power supply terminal, and another of the source electrode and the drain electrode of the sixth transistor is connected to the first node;

wherein another of the source electrode and the drain electrode of the first transistor is connected to the second node, the fifth transistor is one of a P-type transistor and an N-type transistor, and the sixth transistor is another of the P-type transistor and the N-type transistor.

4. The driving circuit of claim 3, wherein, the first power supply terminal and the third power supply terminal are the same power supply terminal; and the second power supply terminal and the fourth power supply terminal are the same power supply terminal.

5. The driving circuit of claim 4, wherein, the signals of the first power supply terminal and the third power supply terminal are a high level signal or a low level signal, and the signals of the second power supply terminal and the fourth power supply terminal are a low level signal or a high level signal.

6. The driving circuit of claim 3, wherein, the first power supply terminal and the fourth power supply terminal are the same power supply terminal; and the second power supply terminal and the third power supply terminal are the same power supply terminal.

7. The driving circuit of claim 6, wherein, the signals of the first power supply terminal and the fourth power supply terminal are a high level signal or a low level signal, and the signals of the second power supply terminal and the third power supply terminal are a low level signal or a high level signal.

8. The driving circuit of claim 1, wherein the output module includes:

a third transistor, wherein a gate of the third transistor is connected to the first node, one of a source and a drain of the third transistor is connected to the first power supply terminal, and another of the source electrode and the drain electrode of the second transistor is connected to the output terminal; and a fourth transistor, wherein a gate of the fourth transistor is connected to the first node, one of a source and a drain of the fourth transistor is connected to the second power supply terminal, and another of the source electrode and the drain electrode of the fourth transistor is connected to the output terminal;

wherein the third transistor is one of a P-type transistor and an N-type transistor, and the fourth transistor is another of the P-type transistor and the N-type transistor.

9. The driving circuit of claim 8, wherein the input module includes:

a seventh transistor, wherein a gate of the seventh transistor is connected to a third node, one of a source and a drain of the seventh transistor is connected to a fourth node, and another of the source electrode and the drain electrode of the seventh transistor is connected to the output terminal; and an eighth transistor, wherein a gate of the eighth transistor is connected to the third node, one of a source and a drain of the sixth transistor is connected to the fourth node, and another of the source electrode and the drain electrode of the eighth transistor is connected to the output terminal;

wherein, another of the source and the drain of the third transistor is connected to the fourth node, and another of the source electrode and the drain electrode of the fourth transistor is connected to the fourth node;

wherein the first signal control terminal is connected to the third node, the seventh transistor is one of a P-type transistor and an N-type transistor, and the eighth transistor is another of the P-type transistor and the N-type transistor.

10. The driving circuit of claim 8, wherein the output module includes:

a seventh transistor, wherein a gate of the seventh transistor is connected to a third node, one of a source and a drain of the seventh transistor is connected to a fourth node, and another of the source electrode and the drain electrode of the seventh transistor is connected to the output terminal; and an eighth transistor, wherein a gate of the eighth transistor is connected to the third node, one of a source and a drain of the sixth transistor is connected to the fourth node, and another of the source electrode and the drain electrode of the eighth transistor is connected to the output terminal;

wherein, another of the source and the drain of the third transistor is connected to the fourth node, and another of the source electrode and the drain electrode of the fourth transistor is connected to the fourth node;

wherein, the second signal control terminal is connected to the third node, the seventh transistor is one of a P-type transistor and an N-type transistor, and the eighth transistor is another of the P-type transistor and the N-type transistor.

11. A display device comprising a driving circuit, wherein the driving circuit includes:

an input module connected to a first signal control terminal, a second signal control terminal, and a first node, respectively, for inputting a level signal to the first node under the control of the first signal control terminal and the second signal control terminal; and an output module connected to a first power supply terminal, a second power supply terminal, the first node, and an output terminal, respectively, for outputting a signal of the first power supply terminal or the second power supply terminal to the output terminal under the control of the level signal of the first node.

12. The display device of claim 11, further comprising:

a timing controller connected to the first signal control terminal and the second signal control terminal of the driving circuit; and a gate driving chip connected to the output terminal of the driving circuit.

13. The display device of claim 11, wherein the input module includes:

a first transistor, wherein a gate of the first transistor is connected to the first signal control terminal, one of a source and a drain of the first transistor is connected to the second signal control terminal, and another of the source electrode and the drain electrode of the first transistor is connected to the first node; and a second transistor, wherein a gate of the second transistor is connected to the first signal control terminal, one of a source and a drain of the second transistor is connected to the second signal control terminal, and another of the source electrode and the drain electrode of the second transistor is connected to the first node;

wherein the first transistor is one of a P-type transistor and an N-type transistor, and the second transistor is another of the P-type transistor and the N-type transistor.

14. The display device of claim 13, wherein the input module includes:

a fifth transistor, wherein a gate of the fifth transistor is connected to a second node, one of a source and a drain of the fifth transistor is connected to a third power supply terminal, and another of the source electrode and the drain electrode of the fifth transistor is connected to the first node; and a sixth transistor, wherein a gate of the sixth transistor is connected to the second node, one of a source and a drain of the sixth transistor is connected to a fourth power supply terminal, and another of the source electrode and the drain electrode of the sixth transistor is connected to the first node;

wherein another of the source electrode and the drain electrode of the first transistor is connected to the second node, the fifth transistor is one of a P-type transistor and an N-type transistor, and the sixth transistor is another of the P-type transistor and the N-type transistor.

15. The display device of claim 14, wherein, the first power supply terminal and the third power supply terminal are the same power supply terminal; and the second power supply terminal and the fourth power supply terminal are the same power supply terminal.

16. The display device of claim 15, wherein, the signals of the first power supply terminal and the third power supply terminal are a high level signal or a low level signal, and the signals of the second power supply terminal and the fourth power supply terminal are a low level signal or a high level signal.

17. The display device of claim 14, wherein, the first power supply terminal and the fourth power supply terminal are the same power supply terminal; and the second power supply terminal and the third power supply terminal are the same power supply terminal.

18. The display device of claim 11, wherein the output module includes:

a third transistor, wherein a gate of the third transistor is connected to the first node, one of a source and a drain of the third transistor is connected to the first power supply terminal, and another of the source electrode and the drain electrode of the second transistor is connected to the output terminal; and a fourth transistor, wherein a gate of the fourth transistor is connected to the first node, one of a source and a drain of the fourth transistor is connected to the second power supply terminal, and another of the source electrode and the drain electrode of the fourth transistor is connected to the output terminal;

wherein the third transistor is one of a P-type transistor and an N-type transistor, and the fourth transistor is another of the P-type transistor and the N-type transistor.

19. The display device of claim 18, wherein the output module includes:

a seventh transistor, wherein a gate of the seventh transistor is connected to a third node, one of a source and a drain of the seventh transistor is connected to a fourth node, and another of the source electrode and the drain electrode of the seventh transistor is connected to the output terminal; and an eighth transistor, wherein a gate of the eighth transistor is connected to the third node, one of a source and a drain of the sixth transistor is connected to the fourth node, and another of the source electrode and the drain electrode of the eighth transistor is connected to the output terminal;

wherein, another of the source and the drain of the third transistor is connected to the fourth node, and another of the source electrode and the drain electrode of the fourth transistor is connected to the fourth node;

wherein the first signal control terminal is connected to the third node, the seventh transistor is one of a P-type transistor and an N-type transistor, and the eighth transistor is another of the P-type transistor and the N-type transistor.

20. The display device of claim 18, wherein the output module further includes:

a seventh transistor, wherein a gate of the seventh transistor is connected to a third node, one of a source and a drain of the seventh transistor is connected to a fourth node, and another of the source electrode and the drain electrode of the seventh transistor is connected to the output terminal; and an eighth transistor, wherein a gate of the eighth transistor is connected to the third node, one of a source and a drain of the sixth transistor is connected to the fourth node, and another of the source electrode and the drain electrode of the eighth transistor is connected to the output terminal;

wherein, another of the source and the drain of the third transistor is connected to the fourth node, and another of the source electrode and the drain electrode of the fourth transistor is connected to the fourth node;

wherein, the second signal control terminal is connected to the third node, the seventh transistor is one of a P-type transistor and an N-type transistor, and the eighth transistor is another of the P-type transistor and the N-type transistor.

* * * * *